(12) United States Patent
Bristow et al.

(10) Patent No.: US 7,837,912 B2
(45) Date of Patent: *Nov. 23, 2010

(54) METHODS OF FORMING A LAYERED ARTICLE

(75) Inventors: Paul Anthony Bristow, Brighton, MI (US); Scott Michael Davis, Lee, MA (US); Jesse Guy Hipwell, Grand Blanc, MI (US); Randall Todd Myers, Pittsfield, MA (US); Erich Otto Teutsch, Richmond, MA (US)

(73) Assignee: Sabic Innovative Plastics IP B.V. (NL)

( * ) Notice: Subject to any disclaimer, the term of this patent is extended or adjusted under 35 U.S.C. 154(b) by 718 days.

This patent is subject to a terminal disclaimer.

(21) Appl. No.: 11/618,950

(22) Filed: Jan. 2, 2007

(65) Prior Publication Data

US 2007/0102849 A1  May 10, 2007

Related U.S. Application Data

(63) Continuation of application No. 10/805,760, filed on Mar. 22, 2004.

(60) Provisional application No. 60/539,188, filed on Jan. 26, 2004.

(51) Int. Cl.
*B29C 51/10* (2006.01)
(52) U.S. Cl. .................. 264/46.8; 264/510; 264/571; 264/321
(58) Field of Classification Search .................. None
See application file for complete search history.

(56) References Cited

U.S. PATENT DOCUMENTS

| | | | |
|---|---|---|---|
| 3,446,686 A | 5/1969 | Butler et al. | |
| 3,938,782 A | 2/1976 | Robertson et al. | |
| 3,947,315 A | 3/1976 | Smith | |
| 4,166,090 A | 8/1979 | Green et al. | |
| 4,201,612 A | 5/1980 | Figge et al. | |
| 4,257,754 A | 3/1981 | Green et al. | |
| 4,529,641 A | 7/1985 | Holtrop et al. | |
| 4,868,030 A | 9/1989 | Mentzer et al. | |
| 5,001,000 A | 3/1991 | Rohrbacher et al. | |

(Continued)

FOREIGN PATENT DOCUMENTS

DE  10110501  8/2002

(Continued)

OTHER PUBLICATIONS

Gerald L. Steele, "Thermoforming Tooling", DuBois and Pribble's Plastic Mold Engineering Handbook, Fifth Edition, Chapter 9, pp. 469-498.

(Continued)

*Primary Examiner*—Monica A Huson
(74) *Attorney, Agent, or Firm*—Cantor Colburn LLP

(57) ABSTRACT

A method of forming a layered article, the method comprises thermoforming a substrate sheet to form a shaped substrate, wherein the shaped substrate is a fiber-reinforced plastic material having a void content sufficient to allow a vacuum to be applied through the shaped substrate; pulling a vacuum through the shaped substrate; and pulling a film layer onto a surface of the shaped substrate to form the layered article.

18 Claims, 2 Drawing Sheets

U.S. PATENT DOCUMENTS

| | | | |
|---|---|---|---|
| 5,215,627 | A | 6/1993 | Willis et al. |
| 5,407,610 | A | 4/1995 | Kohama et al. |
| 5,601,679 | A | 2/1997 | Mulcahy et al. |
| 5,622,756 | A | 4/1997 | Tokoro et al. |
| 5,750,234 | A * | 5/1998 | Johnson et al. ............ 428/141 |
| 5,854,149 | A | 12/1998 | Nagayama et al. |
| 5,968,629 | A * | 10/1999 | Masui et al. ................. 428/77 |
| 6,136,441 | A | 10/2000 | MacGregor et al. |
| 6,224,706 | B1 | 5/2001 | Matich |
| 6,689,474 | B2 | 2/2004 | Pickett et al. |
| 7,060,217 | B2 | 6/2006 | Dunton et al. |
| 2003/0146543 | A1 | 8/2003 | Lebrun et al. |
| 2003/0220036 | A1 | 11/2003 | Lee et al. |
| 2005/0164023 | A1 | 7/2005 | Davis et al. |

FOREIGN PATENT DOCUMENTS

| | | |
|---|---|---|
| EP | 0324680 | 7/1989 |
| EP | 1124878 | 9/1999 |
| EP | 1155794 | 11/2001 |
| WO | WO 00/69945 | 11/2000 |

OTHER PUBLICATIONS

Brister et al., "Zero VOC Sollx Film For Weatherable, High-Gloss, Chemical and Scratch Resistant Performance", Presented at the International Waterborne, High-Solids and Powder Coatings Symposium, Feb. 6-8, 2002, New Orleans, LA, pp. 261-275.

International Search Report for PCT/US2005/001375; Date of Completion Jul. 27, 2005; Date of Mailing Nov. 8, 2005.

EP 0324680 Publication Date Jul. 19, 1989; "Process for the manufacture of a sheet of reinforced thermoplastic material, and sheet thus obtained." (Abstract Only).

Patent Abstracts of Japan; Publication No. 01-228824; Publication Date Dec. 9, 1989; "Vacuum Molding of Thermoplastic Material and Molded Article"; 2 pages.

* cited by examiner

METHODS OF FORMING A LAYERED ARTICLE

CROSS REFERENCE TO RELATED APPLICATIONS

The present application is a continuation application of U.S. patent application Ser. No. 10/805,760 filed Mar. 22, 2004, which claims priority to Provisional U.S. Patent Application No. 60/539,188 filed Jan. 26, 2004, both of which are hereby incorporated by reference in their entirety.

BACKGROUND

Market economics for aesthetic composite structures comprising a substrate and an aesthetic surface layer often favor use of thermosetting resin systems for the substrate. Low raw material and tooling costs are frequently cited as factors supporting selection of thermosetting materials. However, use of thermosetting materials can produce volatile organic compound (VOC) emissions, and generally results in long cycle times.

For example, one commonly used approach for creating aesthetic parts involves a two step procedure, wherein a thermoplastic surface layer is formed using a traditional thermoforming method, a thermosetting material is injected or sprayed behind this surface layer and is cured in-place to create a bi-layered structure having a reinforced sub-layer and a thermoplastic surface layer. Many thermosetting systems and methods are employed to create the reinforced sub-layer. These include, for example, spray-up fiberglass reinforced plastic (FRP), resin transfer molding, vacuum-infusion, and various reinforced foam in-place technologies.

What is needed in the art is a method of making a layered article that produces lower VOC emissions and has a shorter cycle time compared to current methods employing a thermosetting step.

SUMMARY

An embodiment of a method of forming a layered article comprises thermoforming a substrate sheet to form a shaped substrate, wherein the shaped substrate is a fiber-reinforced plastic material having a void content sufficient to allow a vacuum to be applied through the shaped substrate; pulling a vacuum through the shaped substrate; and pulling a film layer onto a surface of the shaped substrate to form the layered article Another embodiment of a method of forming a layered article comprises heating a substrate sheet to a temperature sufficient to allow lofting of fibers of the substrate sheet; disposing the substrate sheet against a membrane assisted pressure box; pushing the substrate sheet onto a mold to form a shaped substrate; heating a film layer; disposing the film layer adjacent to shaped substrate; pulling a vacuum through the shaped substrate; and pulling the film layer against the shaped substrate to form the layered article.

The above-described and other features will be appreciated and understood by those skilled in the art from the following detailed description, drawings, and appended claims.

BRIEF DESCRIPTION OF THE DRAWINGS

Refer now to the figures, which are exemplary embodiments, and wherein the like elements are numbered alike.

DETAILED DESCRIPTION

Figure 1:
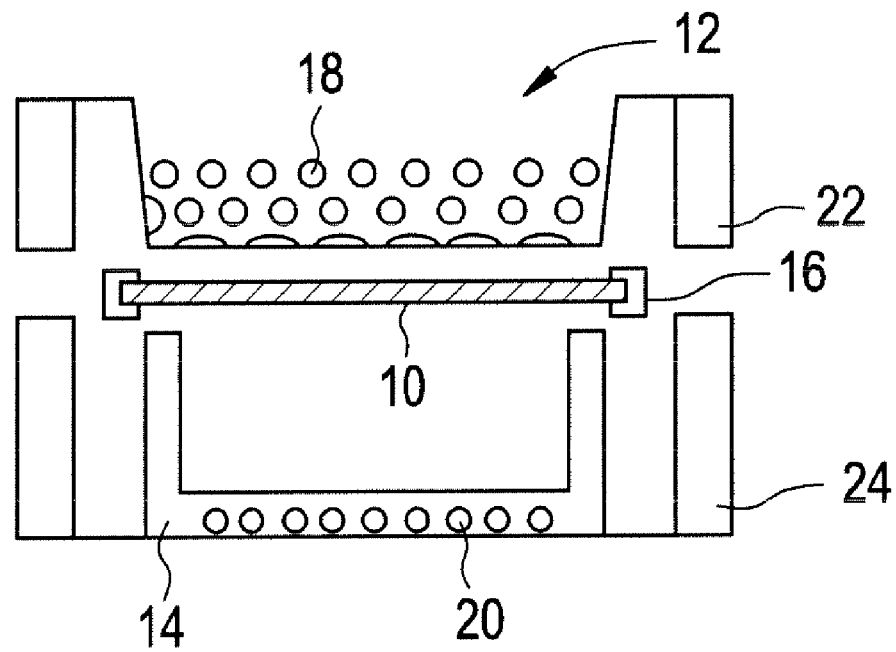
FIG. 1 is a cross-sectional side view of a matched tool with an exemplary substrate to be thermoformed.

Disclosed herein are methods for making plastic layered articles having a substrate with an open-celled structure. It should be noted that, as used herein, the term "open-celled" has its ordinary meaning, and describes cells in fluid communication with adjacent cells such that fluid communication is established from one surface through to an opposite surface. The term "thermoforming" and its various derivatives have their ordinary meaning, and are used herein to generically describe a method of heating and forming a sheet into a desired shape. Thermoforming methods and tools are described in detail in DuBois and Pribble's "Plastics Mold Engineering Handbook", Fifth Edition, 1995, pages 468 to 498.

The term "layer" is used herein for convenience, and includes materials having an irregular shape as well as sheets and films. It should further be noted that the terms "first," "second," and the like herein do not denote any order, quantity, or importance, but rather are used to distinguish one element from another, and the terms "a" and "an" herein do not denote a limitation of quantity, but rather denote the presence of at least one of the referenced item. Furthermore, all ranges disclosed herein are inclusive and combinable (e.g., ranges of "up to about 25 weight percent (wt. %), with about 5 wt. % to about 20 wt. % desired, and about 10 wt. % to about 15 wt. % more desired," is inclusive of the endpoints and all intermediate values of the ranges, e.g., "about 5 wt. % to about 25 wt. %, about 5 wt. % to about 15 wt. %," etc.).

The methods disclosed herein are of particular utility in the manufacture of layered articles comprising a thermoformable film layer disposed on an open-celled, fiber-reinforced thermoformable substrate. The film layer can function as a surface layer for the substrate, and is selected to be both thermoformable and compatible with the substrate. In one embodiment, the film layer is an aesthetic layer. In various embodiments, the film layer can include several layers, e.g., the film layer may comprise a surface layer and a compatible layer. It should be noted that the term "film layer" is used throughout this disclosure merely for convenience, and may refer to embodiments wherein the film layer is single-layered or embodiments where it comprises several layers. Moreover, the materials listed with regard to the film layer may be the same materials employed in the compatible layer. If the film layer comprises an additional layer, e.g., a compatible layer, it is to be understood that the additional layer is compatible with any other layer making up the film layer, the substrate, and any other layers adjacent to the compatible layer.

Further, the substrate and the film layer can comprise the same or different plastic materials that are compatible with each other. As used herein, "compatible" means that the layers are capable of being joined, and do not adversely interact with each other. The plastic materials can comprise thermoplastic materials, thermoset materials, as well as combinations comprising at least one of the foregoing plastic materials. Exemplary thermoplastic materials include polypropylene, polycarbonate (PC), polyester, polyetherimide (PEI), polyarylene ethers, and the like, as well as combinations comprising at least one of the foregoing thermoplastic materials, for example PC/PET blends. Suitable thermoplastic polyesters include, for example, poly(alkylene dicarboxylates) such as poly(ethylene terephthalate) (PET), poly(1,4-butylene terephthalate) (PBT), poly(trimethylene terephthalate) (PTT), poly(ethylene naphthalate) (PEN), poly(butylene naphthalate) (PBN), poly(cyclohexanedimethanol terephthalate), poly(cyclohexanedimethanol-co-ethylene terephthalate) (PETA), and poly(1,4-cyclohexanedimethyl-1,4-cyclohexanedicarboxylate) (PCCD); poly(alkylene arenedioates); and combinations comprising at least one of the foregoing polyesters.

In an exemplary embodiment, the substrate and film layer each comprise a polycarbonate. Linear or branched aromatic polycarbonates may be used. In one embodiment, polycarbonates comprising units derived from one or more of 2,2-bis(4-hydroxyphenyl) propane ("Bisphenol A"), bis(2-hydroxyphenyl) methane, 1,1-bis(4-hydroxyphenyl)-3,3,5-trimethylcyclohexane, fluorenone bisphenol, 1,1-bis(4-hydroxyphenyl) ethane, 2,6-dihydroxynaphthalene, bis(3,5-diethyl-4-hydroxyphenyl) sulfone, 2,2-bis(3,5-dibromo-4-hydroxyphenyl) propane, 4,4'-dihydroxydiphenyl ether, spiro biindane bisphenol, and the like, may be used.

Exemplary thermoset materials include thermosetting resins such as epoxy, phenolic, alkyds, polyester, polyimide, polyurethane, mineral filled silicone, bis-maleimides, cyanate esters, vinyl, and benzocyclobutene resins, in addition to blends, copolymers, mixtures, reaction products and composites comprising at least one of the foregoing.

The plastic materials of the substrate comprise sufficient bonding capability to provide sufficient structural integrity to the substrate to enable thermoforming thereof. For example, the substrate can comprise fibers and thermoplastic material(s) such that the substrate can be disposed in a thermoforming system and thermoformed. In another exemplary embodiment, the substrate can comprise fibers, thermosetting material(s), and an agent wherein the agent retains the structure of the substrate in the desired form (e.g., a sheet) such that the substrate can be disposed in a thermoforming system and thermoformed.

Depending on the particular end use of the article, the substrate and/or the film layer may include one or more additives for the provision or enhancement of a visual effect. Such visual additives include, but are not limited to, pigments and decorative material such as metal flakes, dyes, and luminescent compounds. Specific examples of suitable additives include metallic oxides (such as titanium dioxide and iron oxide); metal hydroxides; metal flakes (such as aluminum flake); chromates (such as lead chromate); sulfides; sulfates; carbonates; carbon black; silica; talc; china clay; phthalocyanine blues and greens, organo reds; organo maroons and other organic pigments and dyes, and the like, as well as combinations comprising at least one of the foregoing visual additives. In an exemplary embodiment, pigments that are stable at high temperatures are used, i.e., colorants that do not substantially degrade or alter at temperatures at or about 350° C.

Light fastness additives may also be present in the film layer and/or substrate, again depending on the particular end use of the article. For example, the film layer and/or substrate may further comprise a light fastness compound, a light fastness antioxidant, and/or a light fastness ozonant. Examples of light fastness compounds include didodecyl-3,3'-thio dipropionate, tris(4-tert-butyl-3-hydroxy-2,6-dimethyl benzyl) isocyanurate, 1,3,5-trimethyl-2,4,6-tris(3,5-di-tert-butyl-4-hydroxybenzyl)benzene, N,N'-beta,beta'-naphthalene-4-phenylene diamine, 4,4'-methylene-bis(dibutyl dithiocarbamate), 2,2,4-trimethyl-1,2-hydroquinoline, and the like.

In addition or alternative to the above additives, property additives may be used in the film layer and/or substrate. Exemplary property additives include impact modifiers, UV absorbers, flame retardants, fillers, stabilizers, ester interchange inhibitors, adhesion promoting agents such as a bisphenol derivative, an aminosilane or derivatives thereof, mold release agents, and the like, as well as combinations comprising at least one of these proposed additives. Examples of ultraviolet light absorbers (UVA) include benzotriazole, benzophenone, triazine, cyanoacrylate, dibenzoylresorcinol, benzoxazinone, and the like as well as hindered amine light stabilizers (HALS) such as 2-(benzotriazol-2-yl)-4-(1,1,3,3-tetramethylbutyl)phenol, 2-(benzotriazol-2-yl)-4-methylphenol, 2-hydroxy-4-octyloxy benzophenone, 2-hydroxy-4-methoxybenzophenone, ethyl-2,2-diphenyl-1-cyanoacrylate, 2-(2'-hydroxy-4'-octyloxy)bis-4,6-(2',4'-dimethylphenyl)triazine, 2-ethyl-2'-ethoxy oxalanide, bis[2-hydroxy-5-methyl-3-(benzotriazol-2-yl)phenyl]-methane, and the like. Combinations comprising one or more of any of the above additives may also be used.

Furthermore, with regard to the substrate, it is a fiber-reinforced plastic material having a porosity sufficient for a vacuum to be applied therethrough after thermoforming. It is noted that the porosity of the substrate may be defined in terms of the void content of the substrate. More particularly, the thermoformed substrate (i.e., a shaped substrate formed by a thermoforming method) can have a void content greater than or equal to about 5 volume percent (vol. %), specifically a void content of about 10 vol. % to about 50 vol. %, more specifically, a void content of about 25 vol. % to about 50 vol. %, wherein the volume percents are based on the total volume of the substrate. For example, the substrate can be an open-celled, fiber-reinforced plastic material. Alternatively, the substrate can be a foraminated, fiber-reinforced plastic material (e.g., openings can be punched, drilled, formed, stamped, or otherwise disposed through the substrate and/or shaped substrate). The term "foraminate" has its ordinary meaning, and is used herein to refer to a substrate that has holes physically disposed therein. It is to be understood by those skilled in the art that an open-celled structure can be construed to have "holes", e.g., cells in fluid communication with adjacent cells such that fluid communication is established from one surface through to an opposite surface. However, the term "foraminated" is used throughout this disclosure merely for convenience to discuss systems having holes other than those formed by a network of cells in fluid communication with each other.

The fibers employed in the substrate are selected such that a fiber-reinforced plastic is formed, and optionally an open-celled fiber-reinforced plastic material. Fiber type, size, amount, and the like may vary with the plastic material employed in making the substrate. In an exemplary embodiment, the fibers are selected to impart the desired void volume to the substrate. In order to attain the desired mold replication and a desired void volume, the fibers can be capable of lofting (e.g., of expanding in the z-direction when heated). Exemplary fiber types include, but are limited to, glass fibers (e.g., E-glass ("electrical glass", e.g., borosilicate glass), S-glass ("structural glass", e.g., magnesia/alumina/silicate glass), and the like), mineral fibers, polymer fibers, natural fibers, and the like, as well as combinations comprising at least one of the foregoing fibers. Optionally, the fiber diameter (width) may be about 6 micrometers to about 25 micrometers. Optionally, the fiber length may be about 2 millimeters (mm) to about 75 mm.

The fiber-reinforced plastic material of the substrate comprises a sufficient amount of plastic material and fibers to provide the desired structural integrity and void volume to the substrate. For example, the fiber-reinforced plastic substrate can comprise about 25 weight percent (wt. %) to about 75 wt. % plastic material, specifically about 35 wt. % to about 65 wt. %, and more specifically about 40 wt. % to about 60 wt. % plastic material may be employed. About 25 wt. % to 75 wt. % fibers with the plastic material, specifically about 35 wt. % to about 65 wt. % and more specifically about 40 wt. % to about 60 wt. % fibers may be used. The weight percents are based on the total weight of the fiber-reinforced plastic substrate.

Examples of suitable commercially available substrate materials include, but are not limited to, AZDEL® Super-Lite® and AZDEL® Glass Mat Thermoplastics (GMT), which are available from AZDEL, Inc., Shelby, N.C., having various matrices including, but not limited to, polyproplylene, polycarbonate (e.g., LEXAN® from General Electric Company), polyester (e.g., VALOX® from General Electric Company), polyetherimide (e.g., ULTEM® from General Electric Company), polyarylene ether (e.g., polyphenylene ether; PPO® Resin from General Electric Company), polystyrene, polyamide and/or combinations comprising at least one of the foregoing.

For example, the substrate may be produced according to the Wiggins Teape method (e.g., as discussed in U.S. Pat. Nos. 3,938,782; 3,947,315; 4,166,090; 4,257,754; and 5,215,627). For example, to produce a mat according to the Wiggins Teape or similar method, fibers, thermoplastic material(s), and any additives are metered and dispersed into a mixing tank fitted with an impeller to form a mixture. The mixture is pumped to a head-box via a distribution manifold. The head box is located above a wire section of a machine of the type utilized for papermaking. The dispersed mixture passes through a moving wire screen using a vacuum, producing a uniform, fibrous wet web. The wet web is passed through a dryer to reduce moisture content and, if a thermoplastic is used, to melt the thermoplastic material(s). A non-woven scrim layer may also be attached to one side or to both sides of the web to facilitate ease of handling the substrate (e.g., to provide structural integrity to a substrate with a thermoset material). The substrate can then be passed through tension rolls and cut (guillotined) into the desired size.

Optionally disposed between the substrate and film layer can be a tie-layer. Use of a tie-layer can provide enhanced bonding, by increasing the amount of resin at the interface, and or by improving the compatibility between the film layer and the substrate layer, particularly where these layers comprise different resins. The tie-layer comprises a material that is selected to be compatible with the film layer and the substrate. Specific examples of compatible materials for use in the tie-layer include polycarbonates; polyesters such as PET, PBT, PTT, PEN, PBN, PETA and PCCD; polyetherimides; polyamides; polyalkylene arenedioates; polyacrylonitrile-containing resins such as, for example, ABS, ASA, or acrylonitrile-(ethylene-polypropylene diamine modified)-styrene (AES); phenylene sulfide; polymethyl methacrylate (PMMA); copolyester carbonates; poly(alkylene dicarboxylates); or the like; or combinations comprising at least one of the foregoing polymers. In one embodiment, the tie-layer comprises a blend of a resin from the film layer and a resin from the substrate layer.

Polycarbonates and blends of polycarbonates with polyesters may advantageously be used in the tie-layers, particularly in combination with film layers comprising the arylate polyester resins as described above. As is known, polycarbonates possess recurring structural units as shown in the following formula:

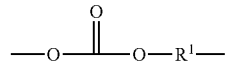

wherein $R^1$ is as defined above. Suitable polycarbonate resins include linear aromatic polycarbonate resins, for example those based comprising units derived from bisphenol A, and branched aromatic polycarbonate resins.

Polyesters and blends comprising two or more of polyesters may also be advantageously be used in the tie-layer, particularly in combination with film layers comprising the arylate polyester resins as described above. For example, one suitable blend for use in the tie-layer comprises, based on the weight of the blend, about 10 wt. % to about 50 wt. % of PBT, PET, glycolized poly(ethylene terephthalate), poly(cyanoterephthalydene) (PCT), PCTA or PCTG and about 50 wt. % to about 90 wt. % of an arylate polyester resin, specifically a resorcinol polyester resin as described above and about 50 wt. % to about 90 wt. % of a resin comprising resorcinol arylate units.

The thermoformable film layer and/or the tie-layer may be produced separately by methods such as molding, extrusion, coating, casting, vacuum deposition, or the like. The layers may then be adhered using an adhesive and/or laminated. In applications wherein the laminate is in the form of a film for subsequent disposal on a pre-formed substrate, the tie-layer may serve as a reinforcement to facilitate the handling of the film layer, which may have relatively little inherent tensile strength.

Alternatively, the thermoformable film layer and the tie-layer may be produced in the form of a laminate by co-injection molding, co-extrusion, overmolding, coating, or the like. For example, the film layer and tie-layer (and other optional layers) may be extruded from separate extruders through separate sheet dies into contact with one another when hot, and then passed through a single sheet of rollers. In another embodiment, the polymer melts of the materials constituting the film layer, the optional tie-layer or layers, and other optional layers may be brought together and into contact with one another through a co-extrusion adapter/feed block and then through a single or multi-manifold die. The adapter/feed block is constructed such that the melts forming the separate layers are deposited as adherent layers on the melt of the center layer. After co-extrusion, the multilayer length of the melt produced can be formed into desired shapes; solid sheets or multi-wall panels, in an extrusion die connected downstream. The melt is then cooled under controlled conditions in known manner by means of calendaring (solid sheet) or vacuum sizing (multi-wall panel) and subsequently cut into lengths. An annealing oven may be optionally provided after sizing or calendaring for the reduction of stresses.

In accordance with the present method, the substrate is thermoformed into a shape substantially corresponding to the shape of the desired final article. Generally, thermoforming comprises the sequential or simultaneous heating and forming of a material onto a mold, wherein the material is originally in the form of a sheet and is formed into a desired shape. Once the desired shape has been obtained, the formed article is cooled below its solidification or glass transition temperature. Generally, any thermoforming method capable of producing a formed substrate having a void content sufficient to enable a vacuum to be pulled therethrough, e.g., a void content of greater than or equal to about 5 vol. % may be employed. For example, suitable thermoforming methods include, but are not limited to, mechanical forming (e.g., matched tool forming), membrane assisted pressure/vacuum forming, membrane assisted pressure/vacuum forming with a plug assist, and the like.

In a matched tool forming method of forming the substrate, a substrate is heated at a sufficient temperature and for a sufficient time to allow the substrate to reach a softening temperature (which may also be referred to as a forming temperature) such that the substrate may be physically worked (i.e., work-formed) into a desired shape. It is noted that the substrate may be heated in various fashions, such as in radiant thermoforming ovens (which may include a top and/or bottom heater). The substrate is then disposed between a male forming tool and a female forming tool. The male and female forming tools are brought in physical contact with each other via stops (disposed at a peripheral edge of each tool) under a pressure sufficient to form the substrate into the desired shape, while maintaining void contents in the ranges previously mentioned. Suitable pressures will depend on the particular substrate composition, and are readily determined by one of ordinary skill in the art without undue experimentation. However, it is noted that use of excessive pressure is to be avoided, as it may close some or all of the cells thereof to below a desired void content, rendering the substrate insufficiently porous.

Referring now to FIG. 1, a cross-sectional view of a matched tool forming is provided. A heated substrate sheet 10 is held in position relative to a male forming tool 12 and female forming tool 14 using clamps 16. It is noted that the male forming tool 12 and the female forming tool 14 are configured to "match", i.e., complement, each other. The male forming tool 12 and the female forming tool 14 may optionally comprise a plurality of holes 18 and 20 respectively. Disposed at a periphery of male forming tool 12 and female forming tool 14 are stops (spacers) 22 and 24 respectively, which are used to determine the thickness of the shaped substrate. The stops 22 and 24 are positioned outside of the forming area. The male tool 12 and female tool 14 are constructed of materials that are compatible with the substrate materials. For example, the tool may be constructed of, but not limited to, the following materials: aluminum, steel, epoxy, silicone rubber, filled tooling resin, and the like.

During forming, the substrate is heated to a temperature sufficient to allow thermoforming and desirably sufficient to allow lofting of the fibers in the substrate. For example, a temperature of about 450° F. (about 232° C.) to about 700° F. (about 371° C.), more specifically, about 550° F. (about 288° C.) to about 650° F. (about 343° C.), is suitable for thermoforming a glass fiber-reinforced polycarbonate substrate sheet. The heated substrate is then formed by creating relative motion between the male tool 12 and female tool 14, such that stops 22 contact stops 24. Bringing the male tool 12 together with the female tool 14 with the substrate sheet 10 therebetween causing the substrate sheet 10 to conform to the shapes of the male and female tools 12, 14. The substrate can then be cooled to form a shaped substrate. A pressure of about 1 atmosphere (about 101 kPa) to about 10 atmosphere (about 1013 kPa), more particularly about 1 atmosphere (about 101 kPa) to about 5 atmosphere (507 kPa) is employed to form the AZDEL® SuperLite® substrate.

In a membrane-assisted vacuum/pressure forming method, a heated substrate is disposed against a pressure box. Vacuum and pressure are simultaneously applied to the substrate. More particularly, a vacuum is pulled through a forming tool and positive pressure is applied to the side of the membrane opposite the side closest to the forming tool. The direction of the vacuum and pressure are indicated schematically in the FIG. 2 by arrows. The vacuum applied through the mold causes the sheet to be pulled into/onto (hereinafter onto) the mold. Suitable pressures (positive and negative) will depend on the particular substrate and are readily determined by one of ordinary skill in the art without undue experimentation. Further, as noted above, excessive pressure is to be avoided, as it may close some or all of the cells, rendering the substrate insufficiently porous.

Figure 2:
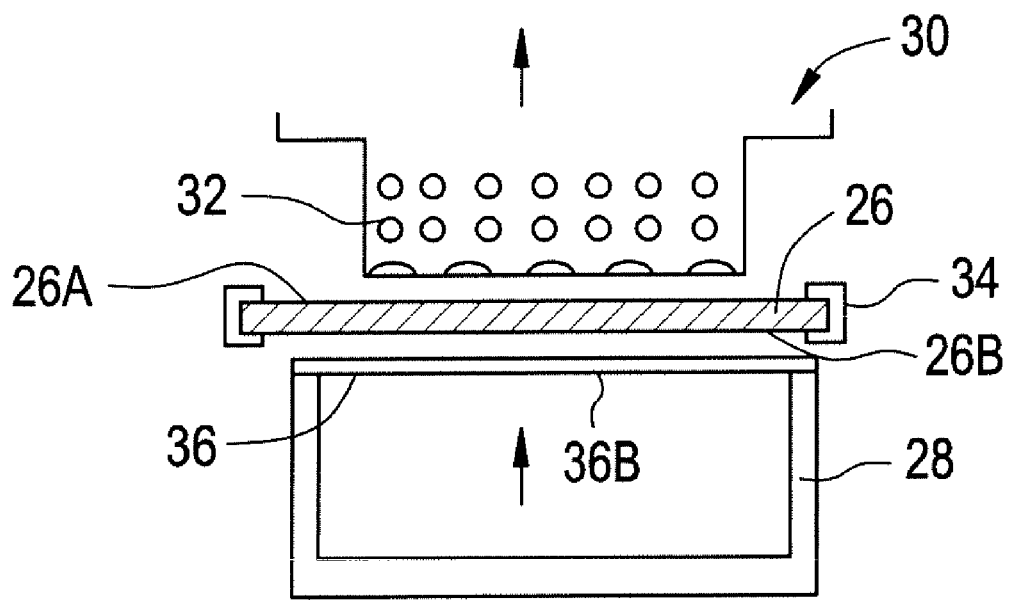
FIG. 2 is a cross-sectional side view of a membrane assisted vacuum/pressure equipment with an exemplary substrate to be thermoformed.

FIG. 2 schematically illustrates a membrane assisted vacuum/pressure thermoforming method. A heated substrate 26 is disposed between a pressure box 28 and a forming tool 30. While forming tool 30 may be a male forming tool or a female forming tool, the forming tool 30 is illustrated as a male forming tool. Forming tool 30 comprises holes 32 such that a vacuum may be applied through the forming tool 30. Clamps 34 may be used to hold the substrate sheet in position relative to the pressure box 28 and the forming tool 30. A membrane 36, more specifically, a non-permeable membrane, is stretched across the opening of the pressure box 28. As discussed above, a first surface 26A of the substrate 26 is brought in physical contact with forming tool 30 via a vacuum being pulled through the forming tool 30, while a second surface 26B is brought in physical contact with membrane 36. A pressure is applied to the membrane 36 from membrane side 36B. Since substrate is an open-celled, fiber-reinforced thermoplastic material having a void content greater than or equal to about 5 vol. % as discussed above, a vacuum is pulled directly through the substrate 26. As such, the membrane 36 is employed to push the substrate onto the forming tool 30 (i.e., a vacuum is pulled through the substrate 26 and pulls membrane 36 and therefore substrate 26 toward tool 30 as the positive pressure from pressure box 28 pushes the membrane 36 toward to tool 30). In other words, a vacuum cannot be pulled through the membrane 36. Rather, the vacuum pulls the membrane 36 toward the forming tool 30 as pressure applied to the membrane 36 pushes the membrane 36 toward the forming tool 30. Once the substrate is on the forming tool 30, it is cooled to form the shaped substrate.

For example, if AZDEL® SuperLite® is the substrate, a pressure of about 1 atmosphere (about 101 kPa) to about 5 atmospheres (about 507 kPa) may be applied to the membrane 36 to push the substrate 26 toward forming tool 30, while a vacuum is being pulled through forming tool 30. More particularly, about 1 (about 101 kPa) atmosphere to about 3 atmospheres (about 304 kPa) of pressure may be applied to the membrane 36.

The above described thermoforming methods are provided merely for exemplary purposes. It is to be understood that the substrate may be formed by any thermoforming method, wherein the resulting molded substrate has a void content such that a vacuum may be applied through the substrate.

After thermoforming the substrate to produce a shaped substrate, the shaped substrate may optionally be trimmed to substantially the final shape of the desired article. The trimming may occur prior to or subsequent to disposing of the film layer on the shaped substrate. The trimming method may include, for example, laser trimming, water jet trimming, trim press trimming, and the like, as well as combinations comprising at least one of the foregoing methods.

Deposition of the film layer onto the shaped substrate comprises using the shaped substrate as the forming tool to pull the film layer onto the shaped substrate. Therefore, once formed, the shaped substrate can remain on the forming tool to receive the film layer or be moved to a different forming tool. Although the shaped substrate may be used without a forming tool, it is desirable to employ the forming tool for structural integrity. During application of the film layer onto the shaped substrate, the film layer is heated in a similar manner as described above for the substrate, and is held in position relative to the holding fixture and substrate using, for example, clamps. A vacuum is then pulled through the shaped substrate to pull the film layer onto the substrate to form a layered article. In various embodiments, a tie-layer may be introduced between the substrate and the film layer to improve adhesion between the substrate and the film layer. When a tie-layer is employed, it is disposed on the film layer, between the shaped substrate and the film layer, before the film layer is thermoformed onto the shaped substrate, such that, when the film layer is pulled onto the shaped substrate, the tie-layer is also pulled on (and possibly extrudes into) the shaped substrate. This tie-layer can assist in bonding the shaped substrate and the film layer together.

Figure 3:
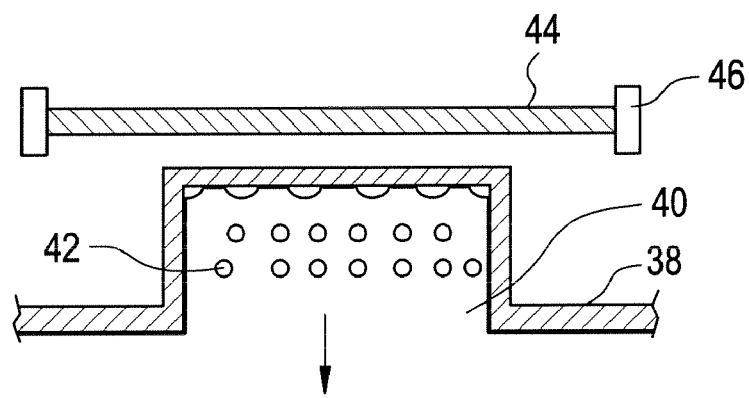
FIG. 3 is a cross-sectional side view of a vacuum thermoforming system with a film layer to be thermoformed over a shaped substrate.

Referring now to FIG. 3, a cross-sectional side view of a vacuuming forming apparatus with the substrate is illustrated. A shaped substrate 38 is placed on a male forming tool 40 comprising a plurality of holes 42. A film layer 44 in the form of a sheet is heated, and held in position relative to the shaped substrate 38 and the male forming tool 40 via clamps 46. A vacuum is pulled through the forming tool 40 as illustrated in the drawing by an arrow. Since the shaped substrate 38 has a sufficient porosity to allow a vacuum to be pulled through it, the surface layer 44 is pulled onto the formed substrate 38 to form the layered article. It is noted that in various embodiments, the layered article may be trimmed, e.g., on the male forming tool 40 by any trimming method, e.g., those trimming methods discussed above.

Figure 4:
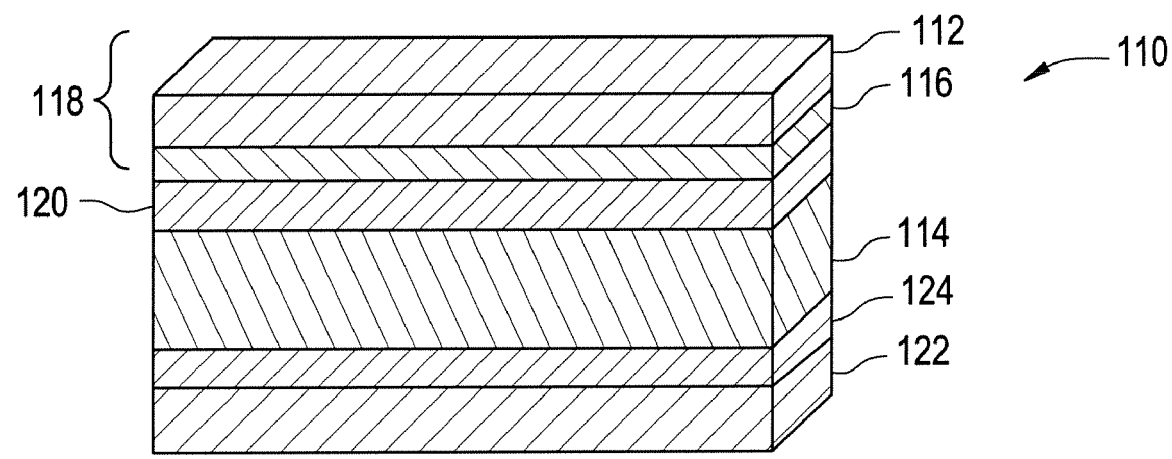
FIG. 4 is a cross sectional view of an exemplary plastic layered article.

An exemplary shaped multilayer article 110 obtainable by the present method is shown in FIG. 4, and comprises a film layer 112 and a substrate 114. The film layer 112 can function as a surface layer for the substrate, and is selected to be both thermoformable and compatible with the substrate. In one embodiment, the outer surface of the film layer 112 may be configured with surface designs, and/or may contain additives that can provide optical effects.

As is further shown in FIG. 4 an optional first compatible layer 116, which may comprise additives that can provide optical effects, may be disposed between film layer 112 and substrate 114. Where optional first compatible layer 116 is used to provide an optical effect, film layer 112 may be clear. The combination of film layer 112 and first compatible layer 116 is often referred to as an aesthetic layer, and is shown in FIG. 4 as 118.

A tie-layer 120 may further be disposed between substrate 114 and optional first compatible layer 116 or film layer 112. Tie-layer 120 may be used to increase bonding between the layers. Where no tie-layer is present, optional first compatible layer may function to increase bonding between film layer 112 and substrate 114.

An optional balance layer 122 may be disposed on a side of substrate 114 opposite film layer 112. The purpose of balance layer 122 is to provide a layer on a side of substrate 114 opposite film layer 112 that matches the coefficient of thermal expansion of film layer 112. A second tie-layer 124 may be disposed between substrate 114 and balance layer 122. In addition, a second compatible layer may be disposed between balance layer 122 and tie-layer 124 or substrate 114 (not shown). It is to be understood that article 110 may be provided in any desired shape, which will be dictated by the end use of the article.

Structural articles formed using the materials and methods disclosed herein may include any use where a layered plastic article may be advantageous. For example, articles include but are not limited to, exterior and interior components for aircraft, automotive (e.g., cars, trucks, motorcycles, and the like). For example, various components include, but are not limited to panels, quarter panels, rocker panels, vertical panels, horizontal panels, fenders, head liners, doors, and the like.

Advantageously, the methods disclosed herein simplify the production of unpainted, cosmetic, structural parts and panels compared to methods employing thermosetting materials. In various embodiments, the production of these parts can proceed on a single forming station with greater efficiency than is currently possible. Methods that use thermoforming have required a separate, non-thermoforming step to dispose the substrate or sub-layer onto a shaped layer (e.g., a shaped film layer), e.g., by spraying, injecting, or the like. However, by employing a substrate with a sufficient void volume to enable a vacuum to be pulled through the shaped substrate to pull another layer onto that substrate, the film layer can also be applied using thermoforming. Since the shaped substrate can be formed on a male or female mold, the subsequent layer (e.g., film layer) can be an aesthetic layer applied to an outer surface of the shaped substrate.

This method reduces the types of equipment used to produce these layered products and can decrease formation time and simplify the layered article manufacturing process. In addition, when this thermoforming method does not employ a thermosetting material, VOC emissions are greatly reduced, if not eliminated, compared to other method using a thermosetting material. The relatively low pressures that are employed in the methods disclosed herein also allows for relatively low tooling costs. Finally, the porous nature of the underlying substrate structure helps reduce thermo-elastic stresses that arise during the attachment of the surface layer.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of forming a layered article, the method comprising:
   thermoforming a substrate sheet to form a shaped substrate, wherein the shaped substrate is a fiber-reinforced plastic material having a void content sufficient to allow a vacuum to be applied through the shaped substrate;
   pulling a vacuum through the shaped substrate; and
   pulling a film layer onto a surface of the shaped substrate to form the layered article.

2. The method of claim 1, wherein the fibers have a fiber diameter of about 6 micrometers to about 25 micrometers, and a fiber length of about 2 millimeters to about 75 millimeters.

3. The method of claim 1, wherein the shaped substrate is foraminated.

4. The method of claim 1, further comprising disposing holes in the substrate using a process selected from the group consisting of punching, drilling, and stamping.

5. The method of claim 1, further comprising forming holes in the substrate.

6. The method of claim 1, wherein the substrate sheet comprises:
   about 25 wt. % to about 75 wt. % plastic material;

about 25 wt. % to about 75 wt. % fibers; and
wherein weight percents are based on a total weight of the substrate sheet.

7. The method of claim 6, wherein the substrate sheet comprises:
about 35 wt. % to about 65 wt. % plastic material; and
about 35 wt. % to about 65 wt. % fibers.

8. The method of claim 6, wherein the plastic material is selected from the group consisting of polycarbonate, polyester, polyetherimide, polyphenylene ether, polystyrene, polyamide, and combinations comprising at least one of the foregoing.

9. The method of claim 1, wherein the substrate sheet is thermoformed with a membrane assisted vacuum pressure forming method with a plug-assist.

10. The method of claim 1, further comprising disposing a tie-layer between the shaped substrate and the film layer.

11. The method of claim 1, wherein the substrate sheet comprises fibers, and wherein thermoforming the substrate sheet further comprises heating the substrate to a temperature sufficient to loft the fibers.

12. The method of claim 11, wherein the temperature is about 450° F. (about 232° C.) to about 700° F. (about 371° C.).

13. The method of claim 1, wherein the substrate sheet further comprises a non-woven scrim disposed on a surface of the substrate sheet.

14. A method of forming a layered article, the method comprising:
heating a substrate sheet comprising fibers, wherein the substrate sheet is heated to a temperature sufficient to loft the fibers;
disposing the substrate sheet against a membrane assisted pressure box;
pushing the substrate sheet onto a mold to form a shaped substrate;
heating a film layer;
disposing the film layer adjacent to the shaped substrate;
pulling a vacuum through the shaped substrate; and
pulling the film layer against the shaped substrate to form the layered article.

15. The method of claim 14, further comprising disposing a tie-layer between the shaped substrate and the film layer.

16. A method of forming a layered article, the method comprising:
thermoforming a substrate sheet to form a shaped substrate, wherein the shaped substrate is a fiber-reinforced plastic material having a void content sufficient to allow a vacuum to be applied through the shaped substrate;
forming holes in the substrate;
pulling a vacuum through the shaped substrate; and
pulling a film layer onto a surface of the shaped substrate to form the layered article;
wherein the substrate sheet comprises about 25 wt. % to about 75 wt. % plastic material, and about 25 wt. % to about 75 wt. % fibers, based on a total weight of the substrate sheet.

17. The method of claim 16, wherein the plastic material is selected from the group consisting of polycarbonate, polyester, polyetherimide, polyphenylene ether, polystyrene, polyamide, and combinations comprising at least one of the foregoing.

18. The method of claim 16, wherein thermoforming the substrate sheet further comprises heating the substrate to a temperature sufficient to loft the fibers.

* * * * *